Patented Jan. 8, 1952

2,581,869

UNITED STATES PATENT OFFICE 2,581,869

N-(5-HALO-2-THENYL)-SUBSTITUTED ETHYLENE DIAMINES

Lucas P. Kyrides, St. Louis, Mo., assignor to Monsanto Chemical Company, St. Louis, Mo., a corporation of Delaware No Drawing. Application August 11, 1947, Serial No. 768,085

12 Claims. (Cl. 260—296)

This invention relates to new tertiary amines of heterocyclic compounds and more particularly to tertiary amines of the formula:

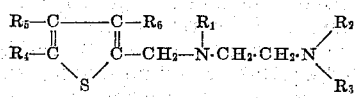

in which $R_1$ represents a radical selected from the group consisting of phenyl, pyridyl, and picolinyl radicals; $R_2$ represents a radical selected from the group consisting of hydrogen and alkyl radicals containing 1–3 carbon atoms; $R_3$ represents an alkyl radical containing 1–3 carbon atoms; $R_4$ represents a radical selected from the group consisting of chlorine and bromine; and $R_5$ and $R_6$ each represent a radical selected from the group consisting of hydrogen and methyl radicals. When $R_1$ is a pyridyl radical in the above formula, the respective isomeric pyridyl substituents, for example, the alpha-pyridyl, beta-pyridyl and gamma-pyridyl substituents are each contemplated as being within the scope of the present invention. When $R_1$ is a picolinyl radical in the above formula, the respective isomeric picolinyl substituents, for example, in the case of the beta-picolinyl radical, the alpha, alpha prime, beta prime and gamma substituents and in the case of the alpha-picolinyl radical, the alpha prime, beta, beta prime, and gamma substituents are contemplated as being within the scope of the present invention.

The compounds of the present invention in which $R_2$ and $R_3$ are ethyl, n-propyl or isopropyl radicals, and $R_4$ is chlorine or bromine, may be prepared, for example, by heating 2-chloromethyl-5-chloro-thiophene, 2-chloromethyl-5-bromo-thiophene, 2-bromomethyl-5-chloro-thiophene, or 2-bromomethyl-5-bromo-thiophene, with a benzene solution of an N—$R_1$—N',N'-dialkyl-ethylenediamine in which the alkyl radicals contain 2–3 carbon atoms and in which $R_1$ is a substituent of the type defined hereinabove.

The compounds of the present invention in which $R_2$ and $R_3$ are methyl radicals and $R_4$ is chlorine or bromine, may be prepared by first preparing the monohydrochloride of an N—$R_1$—N',N'-dimethyl-ethylenediamine, for example, by refluxing a benzene solution of the diamine with an equivalent of ammonium chloride until evolution of ammonia ceases and subsequently heating the monohydrochloride slurry thus formed with 5-chloromethyl-2-chloro-thiophene, 5-chloromethyl-2-bromo-thiophene, 5-bromomethyl-2-chloro-thiophene, or 5-bromomethyl-2-bromo-thiophene.

N-Phenyl-N',N'-dialkyl-ethylenediamines and N-phenyl-N-alkyl-ethylenediamines for use in the preparation of the compounds of the present invention may be prepared by heating 2 moles of aniline with 0.2 mole of the appropriate N-dialkyl-beta-chloroethylamine hydrochloride or N-monoalkyl-beta-chloroethylamine hydrochloride.

N-Pyridyl-N',N'-dialkyl-ethylenediamines, N-picolinyl-N',N'-dialkyl-ethylenediamines and the corresponding N'-monoalkylethylenediamines may be prepared, for example, by heating the appropriate amino pyridines or amino picolines with sodamide and the appropriate N-dialkyl-beta-chloroethylamine or N-monoalkyl-beta-chloroethylamine hydrochloride in a suitable solvent such as toluene.

The salts, for example, the mono-hydrochlorides, sulfates and phosphates, of the free base compounds are therapeutically active and are contemplated as being within the scope of the present invention. The salts may be prepared by any suitable method, for example, by adding the appropriate acid or acidic agent, or a solution thereof in a suitable solvent, such as ether or toluene, to a solution of the free base product in a suitable solvent. The salt is then recovered from the solvent.

The new compounds of the present invention are useful as therapeutic agents and more specifically as anti-histaminic agents.

The following examples serve to illustrate the invention without limiting it thereto.

Example I

A mixture of 186.2 grams (2 moles) of aniline and 28.8 grams (0.2 mole) of N,N-dimethyl-beta-chloroethylamine hydrochloride was heated with stirring at 100° C. for 2 hours, cooled to 60° C., treated with 40 grams of 50% sodium hydroxide solution and 40 cc. of water and stirred at 60° C. for one hour. Excess alkali was added. The mixture was stirred and the oil layer was separated and fractionated. Yield of N-phenyl-N',N'-dimethylethylenediamine, 20.8 grams. Boiling point 117–118° C./8 mm.

To a solution of 26.6 grams of N-phenyl-N',N'-dimethylethylenediamine in 100 cc. of benzene was added 8.7 grams of ammonium chloride and 0.5 cc. of water. The mixture was refluxed for 10 hours during which time ammonia was evolved. The mixture was cooled to 30° C., a solution of 13.5 grams of 2-chloromethyl-5-chloro-thiophene in 35 cc. of benzene was added and the mixture was heated at 65–70° C. for 5½ hours.

Thereafter, 40 grams of 50% sodium hydroxide solution and 40 cc. of water was added, the mixture was stirred vigorously at 55-60° C. for one hour and the benzene layer was separated and distilled. The product obtained was N-phenyl-N-(5-chloro-2-thenyl)-N',N'-dimethyl-ethylenediamine having the formula:

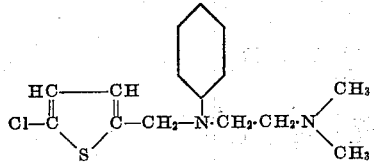

The product was dissolved in a mixture of carbon tetrachloride and acetone and to the solution was added dry hydrogen chloride sufficient to form the monohydrochloride. The product obtained was N-phenyl-N-(5-chloro-2-thenyl)-N',N'-dimethyl-ethylenediamine monohydrochloride. The product was recrystallized from acetone containing 4% water.

*Example II*

N-phenyl-N',N'-diethyl-ethylenediamine was prepared from aniline and N,N-diethyl-beta-chloroethylamine chloride, according to the procedure described in Example I. A solution of 23.0 g. (0.109 mole) of 2-chloromethyl-5-bromo-thiophene in 143 cc. of benzene was dropped into a solution of 41.9 grams (0.218 mole) of N-phenyl-N',N'-diethyl-ethylenediamine in 218 cc. of butanol at room temperature in three hours. The mixture was then agitated at room temperature for 19 hours. Thereafter 100 cc. of water and 8.7 cc. of 50% caustic soda solution were added and the mixture was agitated for 45 minutes. The layers were separated and washed with water. The benzene in butanol layer was distilled. The product obtained was N-phenyl-N-(5-bromo-2-thenyl)-N',N'-diethyl-ethylenediamine having the formula:

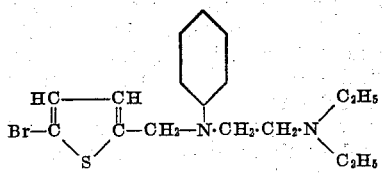

The dihydrochloride salt was prepared in the manner described in Example I, using the appropriate amount of hydrogen chloride.

*Example III*

To a slurry of sodamide in 200 cc. of toluene representing 7.1 grams of sodium was added at 30-40° C., 29.2 grams (0.31 mole) of 2-amino-pyridine. The mixture was heated to reflux temperature and was refluxed for 1½ hours. To the resulting mixture was added over a period of approximately 1 hour a solution of 32 grams of freshly distilled N,N-dimethyl-beta-chloro-ethylamine in 40-50 cc. of dry toluene. The reaction mixture was then heated for 2 hours at reflux temperature. Thereafter, 200 cc. of water was added and the toluene layer was separated and washed with water. The toluene was stripped from the mixture by distillation and the residue was distilled under reduced pressure. The distillate was refractionated and the portion distilled at 93-103° C./1 mm. was recovered. Yield of N-(2-pyridyl)-N',N'-dimethyl-ethylenediamine, 60%.

A solution of 21.5 grams (0.13 mole) of N-(2-pyridyl)-N',N'-dimethyl-ethylenediamine in 25 cc. of dry toluene was added to 3.2 grams of sodium hydride in 150 cc. of toluene. The mixture was refluxed for one hour. To this mixture was added over a period of ½-hour a solution of 20 grams (0.12 mole) of 2-chloromethyl-5-chloro-thiophene in 25 cc. of toluene. The resulting reaction mixture was refluxed for three hours. Thereafter, water was added and the toluene layer was separated and washed with water. The toluene was then stripped off by distillation and the residue was distilled under reduced pressure. The main fraction was redistilled. Yield of N-(2-pyridyl)-N-(5-chloro-2-thenyl)-N',N'-dimethyl-ethylenediamine having the formula:

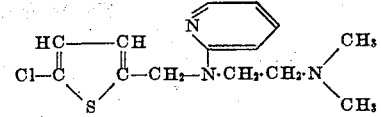

was 13.3 grams; boiling point 180-185° C./3 mm. A portion of the product was dissolved in a mixture of ether and methyl ethyl ketone, and an ether solution of hydrogen chloride was added. The monohydrochloride of N-(2-pyridyl)-N-(5-chloro-2-thenyl)-N',N'-dimethylethylenediamine which separated was washed with ether and dried.

The corresponding compound, N-(2-pyridyl)-N-(5-bromo-2-thenyl)-N',N'-dimethyl-ethylenediamine having the formula:

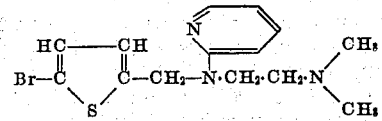

was prepared according to the method of the present example using 2-chloromethyl-5-bromo-thiophene in place of 2-chloromethyl-5-chloro-thiophene. Likewise, the corresponding monohydrochloride of N-(2-pyridyl)-N-(5-bromo-2-thenyl)-N',N'-dimethyl-ethylenediamine was prepared.

*Example IV*

The process of Example III was repeated using 32.3 grams of 3-amino-pyridine in place of 2-amino-pyridine in the preparation of N-(3-pyridyl)-N',N'-dimethyl-ethylenediamine. The product thus obtained was then reacted with 2-bromomethyl-5-chloro-thiophene in the manner described in Example III. A portion of the resulting product, N-(3-pyridyl)-N-(5-chloro-2-thenyl)-N',N'-dimethyl-ethylenediamine, was converted to the monohydrochloride salt by the procedure described in Example III.

*Example V*

The procedure of Example III was followed using 32.3 g. of 4-amino-pyridine in place of 2-amino-pyridine for the preparation of N-(4-pyridyl)-N',N'-dimethyl-ethylenediamine. This product was then reacted with 2-bromomethyl-5-bromo-thiophene according to the procedure of Example III for the preparation of N-(4-pyridyl)-N-(5-bromo-2-thenyl)-N',N'-dimethyl-ethylenediamine having the formula:

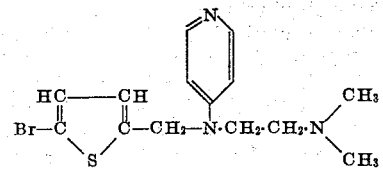

A portion of the resulting product was converted into the monohydrochloride by the procedure described in Example III.

Example VI

In place of 2-amino-pyridine in Example III, 33.5 grams (0.31 mole) of (2-methyl-3-amino-pyridine was employed for the preparation of N-(3-alpha-picolinyl)-N',N'-dimethyl-ethylenediamine. This product was then reacted with 2-chloro-methyl-5-chloro-thiophene according to the procedure described in Example III for the preparation of N-(3-alpha-picolinyl)-N-(5-chloro-2-thenyl)-N',N'-dimethyl-ethylenediamine having the formula:

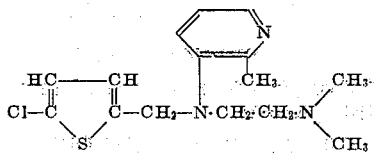

A portion of this product was converted to the monohydrochloride by the procedure described in Example III.

Example VII

In place of 2-amino-pyridine in Example III, 33.5 grams of 2-amino-3-methyl-pyridine was employed in the preparation of N-(2-beta-picolinyl)-N',N'-dimethyl-ethylenediamine according to the procedure of Example III. The product was then reacted with 2-chloromethyl-5-bromo-thiophene according to the procedure of Example III for the preparation of N-(2-beta-picolinyl)-N-(5-bromo-2-thenyl)-N',N'-diethyl-ethylenediamine having the formula:

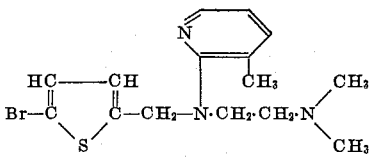

A portion of the resulting product was converted to the monohydrochloride by the procedure described in Example III.

Example VIII

To a slurry of sodamide in 200 cc. of toluene representing 7.1 grams of sodium was added at 30–40° C. 29.2 grams of 2-amino-pyridine. The mixture was heated to reflux temperature and was refluxed for approximately 1½ hours. To the resulting mixture was added over a period of approximately one hour a solution of 37.5 grams of freshly distilled N-methyl-N-ethyl-beta chloroethylamine in 40–50 cc. of dry toluene. The mixture was allowed to stand overnight. Thereafter, 200 cc. of water was added and the toluene layer was separated and washed with water. The toluene was stripped off by distillation and the residue was distilled under reduced pressure. The distillate was refractionated and the product, N-(2-pyridyl)-N'-methyl-N'-ethyl-ethylenediamine was recovered.

A solution of 21.6 grams (0.121 mole) of N-(2-pyridyl)-N'-methyl-N'-ethyl-ethylenediamine in 25 cc. of toluene was added to a slurry of sodamide in 100 cc. of toluene representing 2.8 grams of sodium. The mixture was refluxed for one hour. To this mixture was added over ¼ hour a solution of 20.1 grams (0.121 mole) of 2-chloro-methyl-5-chloro-thiophene in 25 cc. toluene. The resulting reaction mixture was refluxed for three hours. Thereafter water was added and the toluene layer was separated and washed with water. The toluene was then stripped off by distillation and the residue was distilled by reduced pressure. The resulting product was N-(2-pyridyl)-N-(5-chloro-2-thenyl)-N'-methyl-N'-ethyl-ethylenediamine having the formula:

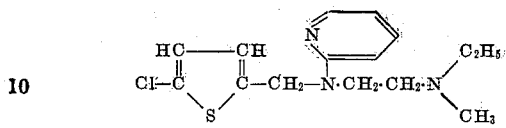

The monohydrochloride of this product was obtained according to the procedure of Example III.

In an analogous manner, the anti-histaminic agents of the present invention in which R2 is hydrogen may be prepared, using an N-monoalkyl-beta-chloroethylamine, for example, N-mono-methyl-beta-chloroethylamine or N-mono-ethyl-beta-chloroethylamine in place of an N,N-dialkyl-beta-chloroethylamine such as N,N-dimethyl-beta-chloroethylamine or N,N-diethyl-beta-chloroethylamine.

The present application is a continuation in part of my copending application, Serial Number 701,077 filed October 4, 1946.

I claim:

1. A compound from the group consisting of tertiary amines having the formula:

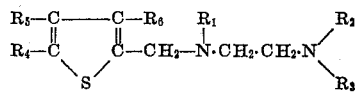

wherein R1 represents a radical selected from the group consisting of phenyl, pyridyl and picolinyl radicals, R2 represents a radical selected from the group consisting of hydrogen and alkyl radicals containing 1–3 carbon atoms, R3 represents an alkyl radical containing 1–3 carbon atoms, R4 represents a halogen radical and R5 and R6 each represent a radical from the group consisting of hydrogen and methyl radicals, and the acid salts thereof.

2. An acid salt of the anti-histaminically active tertiary amine of the formula:

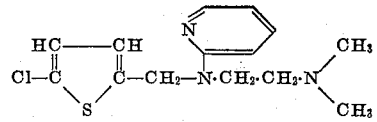

3. An acid salt of the anti-histaminically active tertiary amine of the formula:

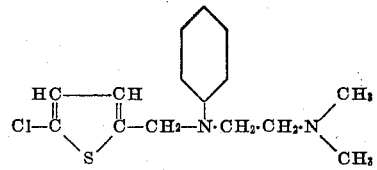

4. An acid salt of the anti-histaminically active tertiary amine of the formula:

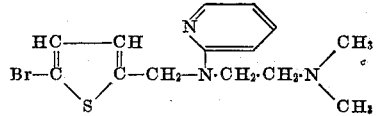

5. The anti-histaminically active tertiary amine monohydrochloride salt of the formula:

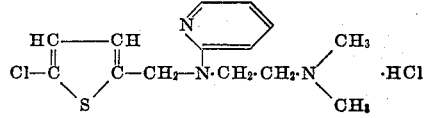

6. The anti-histaminically active tertiary amine monohydrochloride salt of the formula:

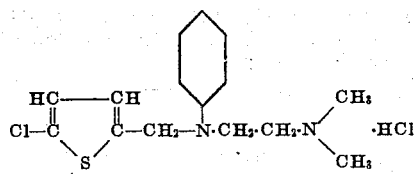

7. N,N - dimethyl - N' - (2 - pyridyl) - N'-(5-halo-2-thenyl)-ethylenediamines.

8. The method which comprises mixing together a 5-halo-2-thenyl halide with an alkali metal salt of N,N - dimethyl - N' - (2 - pyridyl)-ethylenediamine and heating the mixture in an inert solvent under substantially anhydrous conditions until a N,N-dimethyl-N'-(2-pyridyl)-N'-(5-halo -2- thenyl) - ethylenediamine is formed and recovering the said product.

9. An acid salt of an N,N-dimethyl-N'-(2-pyridyl)-N'(5-halo-2-thenyl)-ethylenediamine.

10. N,N - dimethyl - N' - (2 - pyridyl) - N' - (5-chloro-2-thenyl)-ethylenediamine.

11. N,N - dimethyl - N' - (2 - phenyl) - N' - (5-chloro-2-thenyl)-ethylenediamine.

12. A monohydrochloride salt of the formula:

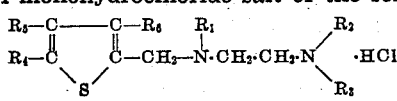

wherein $R_1$ represents a radical selected from the group consisting of phenyl, pyridyl and picolinyl radicals, $R_2$ represents a radical selected from the group consisting of hydrogen and alkyl radicals containing 1–3 carbon atoms, $R_3$ represents an alkyl radical containing 1–3 carbon atoms, $R_4$ represents a halogen radical and $R_5$ and $R_6$ each represent a radical from the group consisting of hydrogen and methyl radicals.

LUCAS P. KYRIDES.

REFERENCES CITED

The following references are of record in the file of this patent:

UNITED STATES PATENTS

| Number | Name | Date |
|---|---|---|
| 2,406,594 | Djerassi | Aug. 27, 1946 |

OTHER REFERENCES

Alles: Journal of Pharmaceutical and Experimental Therapy, 72, 265 (1941).

Textbook of Organic Chemistry, by George Holmes Richter (1938), pp. 649–650.

Beilstein (vierte Auflage), vol. 17, page 37.